(12) United States Patent
Chapman

(10) Patent No.: US 12,553,533 B2
(45) Date of Patent: Feb. 17, 2026

(54) ADAPTOR FOR MECHANICAL DEVICE

(71) Applicant: Kinetrol Ltd, Surrey (GB)

(72) Inventor: Roger Charles Chapman, Surrey (GB)

(73) Assignee: KINETROL LTD., Surrey (GB)

( * ) Notice: Subject to any disclaimer, the term of this patent is extended or adjusted under 35 U.S.C. 154(b) by 13 days.

(21) Appl. No.: 18/627,771

(22) Filed: Apr. 5, 2024

(65) Prior Publication Data

US 2024/0384810 A1  Nov. 21, 2024

(30) Foreign Application Priority Data

May 16, 2023 (GB) ..................................... 2307271

(51) Int. Cl.
*F16K 31/04* (2006.01)

(52) U.S. Cl.
CPC .................................. *F16K 31/043* (2013.01)

(58) Field of Classification Search
CPC .... F16K 31/043; F16K 5/0647; F16K 31/047; F16K 31/44
See application file for complete search history.

(56) References Cited

U.S. PATENT DOCUMENTS

| | | | | |
|---|---|---|---|---|
| 4,549,719 A * | 10/1985 | Baumann | ............... | F16H 25/183 100/291 |
| 4,719,939 A * | 1/1988 | Killian | .................... | F16K 31/16 137/315.35 |
| 5,240,030 A | 8/1993 | Wang | | |
| 6,708,720 B2 | 3/2004 | Chapman | | |
| 9,964,226 B2 * | 5/2018 | Scaramucci | .......... | F16K 27/067 |
| 10,184,566 B2 * | 1/2019 | Haesen | .................... | F01N 1/163 |
| 10,487,956 B2 * | 11/2019 | Meyer | .................... | F16K 31/502 |
| 10,539,241 B2 * | 1/2020 | Jackson | .................... | F16K 5/08 |
| 10,859,184 B2 * | 12/2020 | Taylor | ................. | F16K 37/0016 |
| 11,174,960 B2 * | 11/2021 | Hicks | .................... | F16K 31/043 |
| 11,333,084 B2 * | 5/2022 | Zeumer | ................. | F02D 9/1035 |

(Continued)

FOREIGN PATENT DOCUMENTS

| KR | 101238182 | 2/2013 |
|---|---|---|
| KR | 20180052341 | 5/2018 |

OTHER PUBLICATIONS

Search Report for GB2307271.3 dated Nov. 16, 2023.

*Primary Examiner* — Umashankar Venkatesan
(74) *Attorney, Agent, or Firm* — Stephen J. Weyer, Esq.; Stites & Harbison, PLLC

(57) ABSTRACT

The invention provides an adaptor for connecting a first mechanical device to a second mechanical device. The adaptor comprises a support portion having a first mounting surface and a second mounting surface arranged on opposing sides of the support portion, wherein the support portion is formed of an extruded material. One or more through-holes extend through the support portion between the first mounting surface and the second mounting surface, each of the one or more through-holes being arranged to receive a respective screw or bolt for securing the first mechanical device to the second mechanical device. The adaptor further comprises a rotatable coupling having a first end configured to engage a rotatable drive part of the first mechanical device and a second end configured to engage a rotatable drive part of the second mechanical device, wherein the rotatable coupling is rotatable relative to the support portion.

19 Claims, 5 Drawing Sheets

(56) References Cited

U.S. PATENT DOCUMENTS

| | | | |
|---|---|---|---|
| 12,078,260 B2* | 9/2024 | McMahon | F16K 41/02 |
| 2003/0066981 A1 | 4/2003 | Cross et al. | |
| 2003/0075704 A1 | 4/2003 | Chapman | |
| 2020/0173572 A1* | 6/2020 | Vetal | F24D 5/04 |
| 2021/0180713 A1* | 6/2021 | Mariano | F16K 31/042 |
| 2023/0341059 A1* | 10/2023 | Mey | F16K 5/0647 |
| 2024/0410474 A1* | 12/2024 | Hafner | F16K 27/067 |

* cited by examiner

ADAPTOR FOR MECHANICAL DEVICE

FIELD OF THE INVENTION

The present invention relates to an adaptor for connecting a first mechanical device having a first rotatable drive part to a second mechanical device having a second rotatable drive part. For example, the adaptor can be used to connect a valve to a mechanical device such as a rotary actuator and/or a spring return device.

BACKGROUND

A valve, particularly an industrial valve, is typically opened and closed by means of a valve actuator, such as a rotary actuator. Usually, a valve has a rotatable drive part, such as a rotational control stem, which opens the valve when it is rotated in a first direction and closes the valve when rotated in a second, opposite direction. By convention, the direction of opening is usually anticlockwise looking along the control rotatable drive part towards the valve mechanism. The rotary actuator includes a rotatable drive part, such as a rotatable drive shaft, which engages the rotatable drive part on the valve in order to rotate the rotatable drive part of the valve. In this manner, the rotary actuator can be operated to open and close the valve.

Additionally, a housing of the rotary actuator may be attached (e.g. mounted to) a housing of the valve, in order to facilitate transmission of torque from the rotary actuator to the valve for opening and closing the valve. In some cases, an adaptor may be required to attach the rotary actuator to the valve. This may be due to shapes of the rotary actuator and valve, and/or due to an incompatibility (e.g. mismatch) of attachment points on the rotary actuator with attachment points on the valve. As an example, GB2382400A discloses a valve actuator adaptor for attaching a valve whose mounting is in accordance with ISO 5211/DIN 3337 to a rotary actuator whose mounting is not in accordance with this standard, with the adaptor being made of a die cast material.

The present invention has been devised in light of the above considerations.

SUMMARY OF THE INVENTION

At its most general, the invention provides an adaptor for connecting a first mechanical device to a second mechanical device, the adaptor including a support portion for spacing the first and second mechanical devices, the support portion being formed of an extruded material. The adaptor further includes a rotatable coupling arranged to engage a rotatable drive part of the first mechanical device and a rotatable drive part of the second mechanical device. Using an extruded material for the support portion may contribute to reducing a mass and cost of the adaptor, as well as enable a height to the adaptor to be reduced. In this manner, an assembly of the first and second mechanical devices may be made more lightweight and compact.

According to a first aspect of the invention, there is provided an adaptor for connecting a first mechanical device to a second mechanical device, the adaptor comprising: a support portion having a first mounting surface and a second mounting surface arranged on opposing sides of the support portion, wherein the support portion is formed of an extruded material, and wherein one or more through-holes extend through the support portion between the first mounting surface and the second mounting surface, each of the one or more through-holes being arranged to receive a respective screw or bolt for securing the first mechanical device to the second mechanical device; and a rotatable coupling having a first end configured to engage a rotatable drive part of the first mechanical device and a second end configured to engage a rotatable drive part of the second mechanical device, wherein the rotatable coupling is rotatable relative to the support portion.

The first mechanical device and the second mechanical device may comprise any suitable types of mechanical devices having rotatable drive parts. As an example, the first mechanical device may comprise a valve having a rotatable drive part, the rotatable drive part being rotatable to control opening and closing of the valve. The second mechanical device may then be a device configured to generate a torque for rotating the rotatable drive part of the valve, e.g. to open and close the valve. For example, the second mechanical device may comprise a rotary actuator and/or a spring return device.

The support portion is configured to be positioned between the first and second mechanical devices. Thus, support portion may act as a spacer between the first and second mechanical devices. The first and second mounting surfaces on the support portion are arranged on opposing sides of the support portion, i.e. the first and second mounting surfaces face in opposite directions. The first mounting surface may be arranged to engage a corresponding mounting surface on the first mechanical device; likewise, the second mounting surface may be arranged to engage a corresponding mounting surface on the second mechanical device. Thus, in use, the support portion may be located between mounting surfaces on the first and second mechanical devices. In some cases, the first mounting surface may not necessarily directly engage the mounting surface on the first mechanical device, e.g. there may be an intermediate component between the first mounting surface and the mounting surface of the first mechanical device. Similarly, the second mounting surface may not necessarily directly engage the mounting surface on the second mechanical device, e.g. there may be an intermediate component between the second mounting surface and the mounting surface on the second mechanical device.

The first mounting surface and the second mounting surface may be substantially planar (flat) surfaces. The first mounting surface may be substantially parallel to the second mounting surface.

The support portion is formed of an extruded material. Thus, an extrusion process is used to form (produce) the support portion of the adaptor. As a result of the extrusion process, the extruded material may have an elongated grain structure in a direction of the extrusion. The extrusion process may also result in the extruded material having a smooth outer surface. A further effect of using an extrusion process is that the extruded material of the support portion may have a constant cross-sectional shape (profile) along its length. In other words, the cross-sectional shape of the extruded material does not taper or change along the length of the material. Using an extrusion process to form the support portion may facilitate producing a support portion having a desired cross-sectional shape and length. In particular, this enables the through-holes in the support portion to be formed as part of the extrusion process, without having to machine or drill the holes. The extruded material can then be cut to a desired length, in order to set a length of the support portion. This may also facilitate providing support portions of different lengths (e.g. to adjust a spacing between the first and second mechanical devices), as a same extrusion process can be used to produce support portions of different lengths (by cutting the extruded material to the desired length). In contrast, with a die cast process it may be much more time consuming and expensive to provide adaptors with different lengths, as a different mould would be needed for each different length of adaptor. Moreover, with a die cast process it is typically not possible to provide a constant cross-sectional shape with no taper, as some form of taper is needed to release the part from the die.

In some cases, the extruded material may further be anodised and/or painted, to further protect and improve a corrosion resistance of the support portion.

The one or more through-holes extend through the support portion, i.e. from the first mounting surface to the second mounting surface. Each of the one or more through-holes may be formed in (i.e. extend through) a body of the support portion. The one or more through holes are open at the first mounting surface and the second mounting surface, so that a respective bolt or screw can be inserted through each through-hole. In particular, each of the one or more through holes may be arranged to receive a shaft of a respective bolt or screw for securing the first mechanical device to the second mechanical device. Thus, in use, a respective bolt (or screw) may pass through each through-hole, such that a first end (e.g. tip) of the bolt engages an attachment point (e.g. threaded hole) on the first mechanical device and a second end (e.g. head) of the bolt engages an attachment point on the second mechanical device. In this manner, the respective bolts passing through the through-holes in the support portion act to secure the first and second mechanical devices together. The one or more through-holes may be arranged to match a pattern of attachment points of the first mechanical device and/or on the second mechanical device.

As each through-hole extends through an entire length of the support portion (i.e. from the first mounting surface to the second mounting surface), a number of bolts (or screws) used to secure the first and second mechanical devices together may be reduced. In particular, this enables a single bolt (or screw) passing through the support portion to secure both the first and second mechanical devices to the support portion, e.g. as opposed to a prior art adaptor requiring a first bolt for connecting the adaptor to the first mechanical device, and a second bolt for connecting the adaptor the second mechanical device. Accordingly, the adaptor of the invention may facilitate securing the first and second mechanical devices together. Additionally, the arrangement of the one or more through-holes may enable a length (height) of the support portion to be reduced, thus reducing a size of an assembly of the first and second mechanical devices with the adaptor. This is because the prior art adaptor requires sufficient clearance between the first and second mechanical devices for inserting the bolts for securing the adaptor to the each of the first and second mechanical devices, whereas such clearance is not required with the present invention where the bolt (or screw) passes through the through-hole in the support portion.

The rotatable coupling corresponds to a rotatable part of the adaptor that is configured (adapted or arranged) for releasably engaging a rotatable drive part on the first mechanical device and a rotatable drive part on the second mechanical device. When the rotatable drive part of the first mechanical device and the rotatable drive part of the second mechanical device are engaged with the first and second ends of the rotatable coupling, respectively, the rotatable coupling may act to transmit rotation (torque) from the rotatable drive part of the first mechanical device to the rotatable drive part of the second mechanical device (and vice versa). In other words, the rotatable drive parts of the first and second mechanical devices and the rotatable coupling may rotate together, i.e. as one.

The rotatable coupling may be rotatable about a central axis thereof. The first end and the second end of the rotatable coupling may be opposite ends of the rotatable coupling, e.g. with respect to the axis of rotation of the rotatable coupling.

The first end of the rotatable coupling may comprise a first connector for engagement with the rotatable drive part of the first mechanical device. For example, the first end may have a female connector, such as an opening or a bore, for receiving the rotatable drive part of the first mechanical device. Alternatively, or in addition, the first end may have a male connector, such as a protrusion or a shaft, for being received in an opening or a bore of the rotatable drive part of the first mechanical device.

The second end of the rotatable coupling may comprise a second connector for engagement with the rotatable drive part of the second mechanical device. For example, the second end may have a female connector, such as an opening or a bore, for receiving the rotatable drive part of the second mechanical device. Alternatively, or in addition, the second end may have a male connector, such as a protrusion or a shaft, for being received in an opening or a bore of the rotatable drive part of the second mechanical device.

The rotatable coupling is rotatable relative to the support portion. For example, the rotatable coupling may be rotatably connected to the support portion, e.g. via any suitable rotatable connection. Alternatively, the rotatable coupling may be separate (e.g. spaced) from the support portion, to allow rotation of the rotatable coupling relative to the support portion.

The rotatable coupling may be formed of any suitable material. In some embodiments, the rotatable coupling may be formed of an extruded material, which may be a same or different extruded material as the support portion. Alternatively, the rotatable coupling may be formed of a die cast material. The rotatable coupling may be formed of a suitably hard material, to enable effective transmission of torque between the drive parts, and to reduce wear on the rotatable coupling. For example, the rotatable coupling may be formed of steel.

The support portion may comprise a locating feature which extends from the first mounting surface to the second mounting surface. As the locating feature extends from the first mounting surface to the second mounting surface, it may be formed as part of the extrusion process for making the support portion, without having to further machine the support portion. In other words, the locating feature may be a feature in a cross-sectional shape of the support portion. The locating feature may be configured to engage a corresponding feature when the support portion is secured between the first mechanical device and the second mechanical device. This may serve to accurately position (locate) the support portion relative to the first mechanical device and/or the second mechanical device, which may facilitate securing the first and second mechanical devices together. For example, the locating feature may be configured for engagement with a corresponding locating feature on a mounting surface of the first mechanical device and/or for engagement with a corresponding locating feature on a mounting surface of the second mechanical device.

The locating feature may be formed in (or on) a side surface of the support portion linking the first mounting surface and the second mounting surface.

The locating feature may comprise a groove and/or a protrusion on the side surface of the support portion. The groove and/or protrusion may thus extend on the side surface between the first mounting surface and the second mounting surface. In this manner, a corresponding locating feature (e.g. on the first and/or second mechanical device) can engage the groove and/or protrusion on the side surface of the support portion, to facilitate positioning of the support portion.

In some cases, a cross-sectional shape of the support portion may be adapted for engagement with a raised register on the mounting surface of the first mechanical device and/or for engagement with a raised register on the mounting surface of the second mechanical device. This may facilitate positioning the support portion relative to the mounting surfaces on the first and second mechanical devices, to align the through-holes in the support portion with attachment points on the first and second mechanical devices. As an example, a cross-sectional shape of the support portion may be complementary to a shape of the raised register on the mounting surface of the first mechanical device and/or the second mechanical device. Where an adaptor flange is used, as discussed further below, the raised register may be provided on a surface of the adaptor flange arranged for engagement with a mounting surface of the support portion.

The support portion may be formed of extruded aluminium or an aluminium alloy. This may make the support portion relatively lightweight, and inexpensive to produce. Thus, the mass of an assembly including the first and second mechanical devices and the adaptor of the invention may be reduced, e.g. compared to assemblies including a conventional adaptor. Indeed, conventional valve adaptors are typically formed of a die cast material such as steel, which is heavier and more expensive. Different alloying elements may be used with aluminium, in order to achieve desired strength and resistance characteristics.

The support portion may comprise a body through which a first one and a second one of the one or more through-holes extend; the body may include a connecting part which connects a first part of the body through which the first through-hole extends and a second part of the body through which the second through-hole extends; and a thickness of the connecting part may be less than a width of the first part and the second part in a direction normal to a longitudinal direction of the first and second through-holes. Reducing a thickness of the connecting part relative to the first and second parts of the body may contribute to reducing a mass of the support portion. The first and second parts of the body may be spaced apart from one another, with the connecting part extending between the first and second parts. A width of the first part may include a width of the first through-hole and a portion of material surrounding the first through-hole; likewise, a width of the second part may include a width of the second through-hole and a portion of material surrounding the second through-hole. As no through-hole may be formed in the connecting part, the thickness of the connecting part may be reduced relative to the widths of the first and second parts. Providing each of the first and second part with a respective through-hole enables a bolt (or screw) to pass through each of the first and second part to secure the first and second mechanical devices together. This may improve a stability with which the first and second mechanical devices are secured together.

Where the support portion includes a locating feature on its side surface, the locating feature may be on a side surface of the connecting part of the body. In other words, the locating feature may be located between the first part and the second part, such that it is positioned between the first and second through-holes. This may facilitate correctly aligning the first and second through-holes relative to the first and second mechanical devices, to facilitate securing the first and second mechanical devices together.

In some embodiments, the support portion may comprise a first support portion and a second support portion which is separate from the first support portion; and a respective through-hole of the one or more through-holes may extend through each of the first support portion and the second support portion. In other words, rather than being formed of a single piece of material, the support portion may comprise multiple separate pieces of material (i.e. the first support portion and the second support portion), each of which includes a respective through-hole. This may enable an amount of material used for the support portion to be reduced, thus reducing a mass of the adaptor. The first and second support portions may be spaced apart by a gap, which may contribute to improving a stability with which the first and second mechanical devices can be secured together. This may also facilitate access to the rotatable coupling and/or the drive parts, as these may be accessed via the gap between the first and second support portions. Additionally, using first and second support portions which are spaced by a gap may avoid pooling of any substance (e.g. liquid) which may leak from one of the mechanical devices (e.g. a valve).

The first support portion and the second support portion being separate may mean that they are separate pieces of material. In use, the first support portion and the second support portion may be arranged next to one another between the first and second mechanical devices.

Each of the first support portion and the second support portion of the support portion may have any of the features discussed above in relation to the support portion. For instance, each of the first support portion and the second support portion may be formed of an extruded material (e.g. the same extruded material). Each of the first support portion and the second support portion may comprise a respective first mounting surface and second mounting surface, in line with the discussion above. At least one of the one or more through-holes may extend through the first support portion; in some cases two or more through-holes may extend through the first support portion. Similarly, at least one of the one or more through-holes may extend through the second support portion; in some cases two or more through-holes may extend through the second support portion. Each of the first support portion and the second support portion may comprise a respective locating feature on its side surface.

In some cases, each of the first support portion and the second support portion may include a respective body as described above, i.e. with first and second parts and a connecting part.

The rotatable coupling may be arranged in a gap between the first support portion and the second support portion. In this manner, the first and second support portion may be located on either side of the rotatable coupling. This may improve a stability with which the first and second mechanical devices are secured together, by providing support for the mechanical devices on either side of the rotatable coupling. For example, the first and second support portion may be arranged symmetrically about an axis of rotation of the rotatable coupling. The gap between the first support portion and the second support portion may be dimensioned to receive the rotatable coupling. For example, the gap may be larger than an outer diameter of the rotatable coupling.

The first support portion and the second support portion may comprise a same cross-sectional shape. In this manner, the first support portion and the second support portion may be formed via the same extrusion process, which may simplify a manufacture of the adaptor. For example, the first support portion and the second support portion may be cut from a same piece of extruded material. Providing the first support portion and the second support portion may also enable the first and second support portions to be arranged symmetrically about the rotation axis of the rotatable coupling, further contributing to a stability with which the first and second mechanical devices can be secured together.

The one or more through-holes in the support portion may be arranged for alignment with attachment points in accordance with an ISO and/or DIN standard. In other words a layout (e.g. spacing, dimensions) of the one or more through-holes may be arranged to match attachment points in accordance with the ISO and/or DIN standard. In this manner, the through-holes in the support portion can be aligned with attachment points in accordance with the ISO and/or DIN standard, so that bolts (or screws) passing through the through holes can engage the attachment points to secure the first and second mechanical devices together. For example, the first mechanical device (e.g. a valve) may comprise a set of attachment points (e.g. threaded holes) which are arranged in accordance with an ISO and/or DIN standard. Then, the through-holes in the support portion can be aligned with the attachment points on the first mechanical device, to enable bolts (or screws) passing through the through-holes to engage the attachment points on the first mechanical device. As a specific example, the attachment points may be in accordance with standards ISO 5211 (reference number ISO 5211:2001 (E), published Feb. 15, 2001) and/or DIN 3337 (published September 1985). These standards may be used for dimensions of an interface between a valve and an actuator, such as a part turn valve and part turn actuator.

The one or more through holes may comprise a plurality of through-holes arranged around the rotatable coupling. In this manner, the first and second mechanical devices may be secured together at multiple different points around the rotatable coupling, which may provide a stable connection between the first and second mechanical device. In particular, this may ensure effective transmission of torque between the rotatable drive parts of the first and second mechanical devices. As an example, the plurality of through-holes may be evenly spaced about the rotation axis of the rotatable coupling.

The adaptor may further comprise an adaptor flange, the adaptor flange having: a first set of attachment points for attaching the adaptor flange to the second mechanical device; and a second set of attachment points for alignment with the one or more through-holes. In this manner, the first set of attachment points can be used to attach (secure) the adaptor flange to the second mechanical device. Then, the second set of attachment points can engage with bolts (or screws) passing through the through-holes in the support portion for securing the first and second mechanical devices together. Thus, the adaptor flange provides an interface between the second mechanical device and the support portion. This enables first and second mechanical devices having different arrangements of attachment points to be connected together, by arranging the first and second sets of attachment points on the adaptor flange accordingly. For example, the one or more through-holes in the support portion may be arranged for alignment with a set of attachment points on the valve, such that the bolts (or screws) passing through the through-holes in the support portion can directly engage the attachment points on the first mechanical device.

The first set of attachment points may be arranged for alignment with a corresponding set of attachment points on the second mechanical device. For instance, the first set of attachment points may comprise, for example, a first set of holes (e.g. through-holes) in the adaptor flange, to enable the adaptor flange to be screwed or bolted to the second mechanical device. The adaptor flange may comprise a first surface arranged to engage (abut) a surface on the second mechanical device when the adaptor flange is attached to the second mechanical device.

The adaptor flange may comprise a second surface arranged to engage (abut) the second mounting surface on the support portion. Thus, when the second surface of the adaptor flange is engaged with the second mounting surface of the support portion, the second set of attachment points may be aligned with the one or more through-holes in the support portion, such that bolts (or screws) passing through the through-holes can engage the second set of attachment points on the adaptor flange. The first and second surfaces of the adaptor flange may be on opposite sides of the adaptor flange, i.e. they may face in opposite directions. The first and second surfaces of the adaptor flange may comprise planar surfaces.

The second set of attachment points may comprise, for example, a second set of holes (e.g. through-holes) arranged for alignment with the one or more through-holes in the support portion.

The first set of attachment points and the second set of attachment points on the adaptor flange may have different arrangements. Thus, the adaptor flange may serve as an adaptor between a first arrangement of attachment points (e.g. on one of the mechanical devices) and a second arrangement of attachment points (e.g. on the other mechanical device). In particular, the first set of attachment points may match a first arrangement of attachment points on the second mechanical device, whilst the second set of attachment points and the one or more through-holes in the support portion may match a second arrangement of attachment points on the first mechanical device.

As discussed above, the one or more through-holes in the support portion may be arranged for alignment with attachment points in the first mechanical device in accordance with an ISO and/or DIN standard. In such a case, the second set of attachment points on the adaptor flange may be arranged in accordance with the ISO and/or DIN standard, to enable alignment of the second set of attachment points with the one or more through-holes. The first set of attachment points may be arranged for alignment with a set of attachment points on the second mechanical device which are not in accordance with the standard.

In some cases, the adaptor flange may comprise a third set of attachment points, which are arranged according to another (different) ISO and/or DIN standard compared to the second set of attachment points. This may enable the same adaptor flange to be used with support portions having different standards. Thus, for example, a single die cast process may be used to make an adaptor flange which can be used to fit first mechanical devices having different attachment standards.

The adaptor flange may include an opening (aperture) for receiving the second end of the rotatable coupling, to enable connection of the second end of the rotatable coupling to the rotatable drive part of the second mechanical device via the opening in the adaptor flange. The opening in the adaptor flange may be larger than a cross-sectional area of the rotatable coupling, to enable rotation of the rotatable coupling relative to the adaptor flange. The first and second sets of attachment points may be arranged around the opening in the adaptor flange.

A thickness of the adaptor flange (e.g. between its first and second surfaces) may be relatively small compared to a distance between the first and second mounting surfaces of the support portion. This may serve to reduce a spacing between the first and second mechanical devices. For example, the thickness of the adaptor flange may be less than half the distance between the first and second mounting surfaces of the support portion.

Where the support portion comprises a locating feature (e.g. on its side surface), the adaptor flange may comprise a surface having a protrusion arranged to engage the locating feature on the support portion when the surface of the adaptor flange is engaged with the second mounting surface of the support portion. This may facilitate positioning the support portion relative to the adaptor flange, in order to align the one or more through-holes with the second set of attachment points. The protrusion may have a shape that is adapted (e.g. complementary) to the locating feature on the support portion. The surface with the protrusion may correspond to the second surface of the adaptor flange mentioned above. The protrusion may, for example, correspond to a locating pin or dowel protruding from the surface of the adaptor flange.

The adaptor flange may be formed of a die cast material. For example, the adaptor flange may be formed of die cast steel, or some other die cast material. Thus, the adaptor flange may be formed of a die cast material so as to have a standardised shape and size, whilst the support portion is formed of an extruded material to enable its length to be adjusted (by cutting the extruded material to a desired length).

The adaptor of the first aspect of the invention may be included in an apparatus having a first mechanical device and a second mechanical device. Thus, according to a second aspect of the invention, there is provided an apparatus comprising: a first mechanical device having a rotatable drive part; a second mechanical device having a rotatable drive part; and an adaptor according to any preceding claim; wherein the support portion is positioned between the first mechanical device and the second mechanical device, with a respective bolt (or screw) extending through each of the one or more through-holes to secure the first mechanical device to the second mechanical device; and wherein the first end of the rotatable coupling is engaged with the rotatable drive part of the first mechanical device, and the second end of the rotatable coupling is engaged with the rotatable drive part of the second mechanical device. Any of the features described above in relation to the first aspect of the invention may be shared with the second aspect of the invention.

The first mounting surface on the support portion may be engaged with a mounting surface on the first mechanical device, which may be on a housing of the first mechanical device. The second mounting surface on the support portion may be engaged with a mounting surface on the second mechanical device, which may be on a housing of the second mechanical device. Alternatively, where the adaptor includes an adaptor flange, the adaptor flange may be positioned between the second mounting surface of the support portion and the mounting surface of the second mechanical device, i.e. the second mounting surface may be engaged with the second surface of the adaptor flange.

As an example, a first end (e.g. tip) of each bolt (or screw) may be engaged with a respective attachment point (such as a threaded hole) in or on the mounting surface of the first mechanical device. A second end (e.g. head) of each bolt may be engaged with a respective attachment point on the second mechanical device. Alternatively, where the adaptor includes an adaptor flange, the adaptor flange may be attached to a housing of the second mechanical device, and the second end of each bolt may be engaged with a respective attachment point on the adaptor flange.

As the rotatable drive part of the first mechanical device and the rotatable drive part of the second mechanical device are engaged with respective ends of the rotatable coupling, the rotatable coupling and rotatable drive parts of the first and second mechanical devices may rotate together as one. In particular, a torque applied to the rotatable drive part of the first mechanical device may be transmitted to the rotatable drive part of the second mechanical device via the rotatable coupling (and vice versa).

Where the support portion comprises a locating feature, the locating feature may be engaged with a protrusion on the mounting surface on the first mechanical device. Additionally or alternatively, the locating feature may be engaged with a protrusion on the mounting surface of the second mechanical device; or, where an adaptor flange is used, the locating feature may be engaged with a protrusion on the adaptor flange.

The apparatus may further comprise a compressed spring washer on each respective bolt. The compressed spring washers may serve to compensate for any differential thermal expansion between different parts of the apparatus. In particular, the compressed spring washers may serve to ensure that the support portion remains tightly secured between first and second mechanical devices, and avoid loosening of the connection between the first and second mechanical devices. The washers may be mounted on the bolts such that they are compressed when the bolts are tightened. As an example, each spring washer may be arranged on its respective bolt such that it is compressed by a head of the bolt when the bolt is tightened. The spring washer may be compressed between the head of the bolt and a surface which may be on the second mechanical device or the adaptor flange.

In some cases, a head of each respective bolt may be located in a housing of the second mechanical device such that the bolt protrudes through an opening in the housing. Thus, the bolt may be tightened from within the housing of the second mechanical device. In this manner, once the housing of the second mechanical device is closed, the bolt may not be accessible from outside the apparatus. This may improve a safety of the apparatus by restricting access to the bolts, e.g. to prevent tampering. Locating the head of the bolts inside the housing of the second mechanical device may also enable a length of the adaptor to be reduced, e.g. compared to a conventional adaptor where heads of the bolts are located outside the housings of the mechanical devices. The housing of the second mechanical device may include one or more openings (apertures), through which the bolts protrude. The bolts protruding from the housing of the second mechanical device may then pass through the through-holes in the support portion, to engage attachment points in the first mechanical device. In such an embodiment, the openings in the housing of the second mechanical device may be in alignment with the through-holes in the support portion, which are themselves aligned with the attachment points on the first mechanical device.

A seal may be provided between the bolt and the housing. This may serve to seal the housing of the second mechanical device, and prevent substances (e.g. liquids) from entering the housing via the opening through which the bolt protrudes. For instance, a seal may be provided around the bolt in the opening. As an example, a sealing washer may be located on the bolt, and clamped between a head of the bolt and an inner surface of the housing.

The first mechanical device may comprise a valve, and the second mechanical device may comprise a rotary actuator and/or a spring return device.

In some cases, the second mechanical device may comprise a rotary actuator which is connected to the valve via the adaptor, to control opening and closing of the valve. In other cases, the second mechanical device may further comprise a spring return device, which may act as a mechanical fail-safe. The spring return device can be configured to return the valve to a predetermined safe (e.g. closed) condition using mechanical energy stored in a spring, typically a rotary spring such as a clock-spring. The spring return device may be coupled to the rotatable drive part of the valve (via the rotatable coupling of the adaptor) to apply a torque which urges the valve towards the predetermined safe condition. In this manner, if the rotary actuator fails, the valve may be automatically returned to the predetermined safe condition under action of the spring return device. The spring return device can include a rotatable coupling which is connected on one side to the rotatable drive part of the rotary actuator, and on another side to the second end of the rotatable coupling of the adaptor.

The valve may comprise any suitable type of valve, such as a ball valve and/or a part turn valve. The valve may be configured such that rotation of its rotatable drive part (e.g. control stem) in a first direction opens the valve, and rotation of its rotatable drive part in a second, opposite direction closes the valve.

The rotary actuator may be an actuator for causing rotation of its rotatable drive part. The rotary actuator may be manually powered, e.g. via a handle for applying a torque, or may be electrically, pneumatically, or hydraulically powered. When power is provided to the rotary actuator, the rotary actuator provides a torque to its rotatable drive part. As the rotatable drive part of the rotary actuator is coupled to the rotatable drive part of the valve via the rotatable coupling of the adaptor, torque from the rotary actuator is transmitted to rotatable drive part of the valve.

According to a third aspect of the invention, there is provided a method of connecting a first mechanical device to a second mechanical device. The method comprises forming a support portion of an adaptor via a material extrusion process, wherein one or more through-holes extend through the support portion between a first mounting surface and a second mounting surface arranged on opposing sides of the support portion; engaging a first end of a rotatable coupling of the adaptor with a rotatable drive part of the first mechanical device, and engaging a second end of the rotatable coupling with a rotatable drive part of the second mechanical device; positioning the support portion between the first mechanical device and the second mechanical device, and securing the first mechanical device to the second mechanical device with a respective bolt passing through each of the one or more through-holes. The method of the third aspect of the invention may be used for connecting the first mechanical device and the second mechanical device together to form an apparatus according to the second aspect of the invention. Therefore, any features discussed above in relation to preceding aspects of the invention can be shared with the third aspect of the invention.

The material extrusion process may comprise pushing the material through a die to impart the material with a desired cross-sectional shape. The cross-sectional shape may include the one or more through-holes. Thus, the one or more through-holes may extend in a direction of the extrusion. Similarly, where the support portion includes a locating feature, the cross-sectional shape may include the locating feature, such that the locating feature extends in a direction of the extrusion.

The extrusion process may form a piece of extruded material. The method may comprise cutting the piece of extruded material to a predetermined length, in order to form the support portion. The cut may be in a plane substantially normal to the direction of extrusion. Where the support portion comprises a first support portion and a second support portion, the piece of extruded material may be cut to form the two support portions. In other words, the first support portion may correspond to a respective sections of the piece of extruded material.

Where an aluminium alloy is used, an alloying material may be chosen so as to control strength, corrosion resistance, ductility and cost of the support portion, to provide a support portion having desired properties.

The method may comprise anodising the extruded material. This may serve to further protect and improve an environmental (corrosion) resistance of the support portion.

The method may comprise painting the extruded material. This may serve to further protect and improve an environmental (corrosion) resistance of the support portion.

The rotatable coupling may be formed using any suitable process, such as a material extrusion process or a die casting process.

Where the adaptor includes an adaptor flange, the adaptor flange may be formed using any suitable process, such as a material extrusion process or a die casting process.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION; FURTHER OPTIONAL FEATURES

Aspects and embodiments of the present invention will now be discussed with reference to the accompanying figures. Further aspects and embodiments will be apparent to those skilled in the art.

Figure 1:
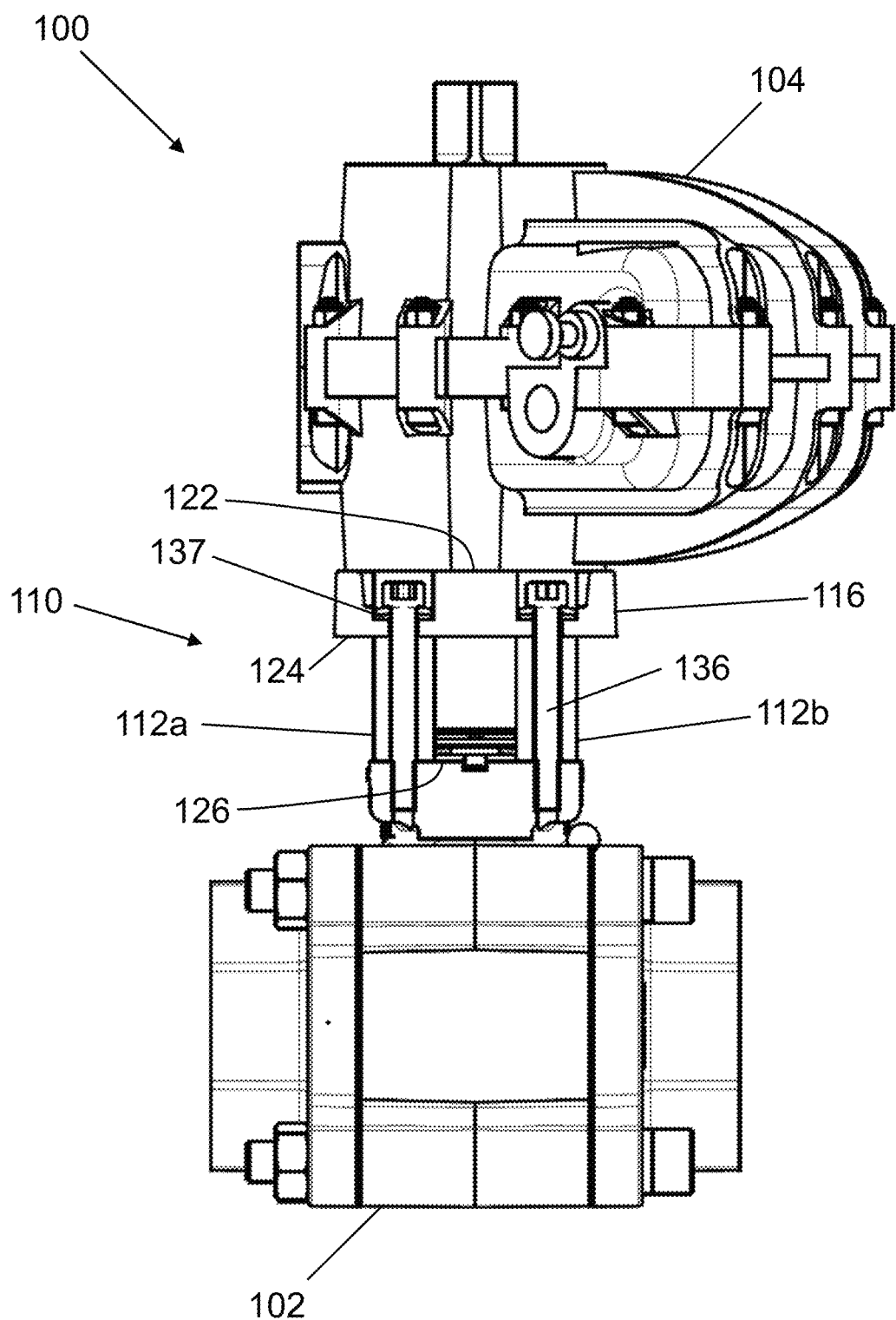
FIG. 1 shows a schematic side view of an apparatus according to an embodiment of the invention, which includes an adaptor according to an embodiment of the invention; the side view of FIG. 1 includes a cross-section through the adaptor.
Figure 2:
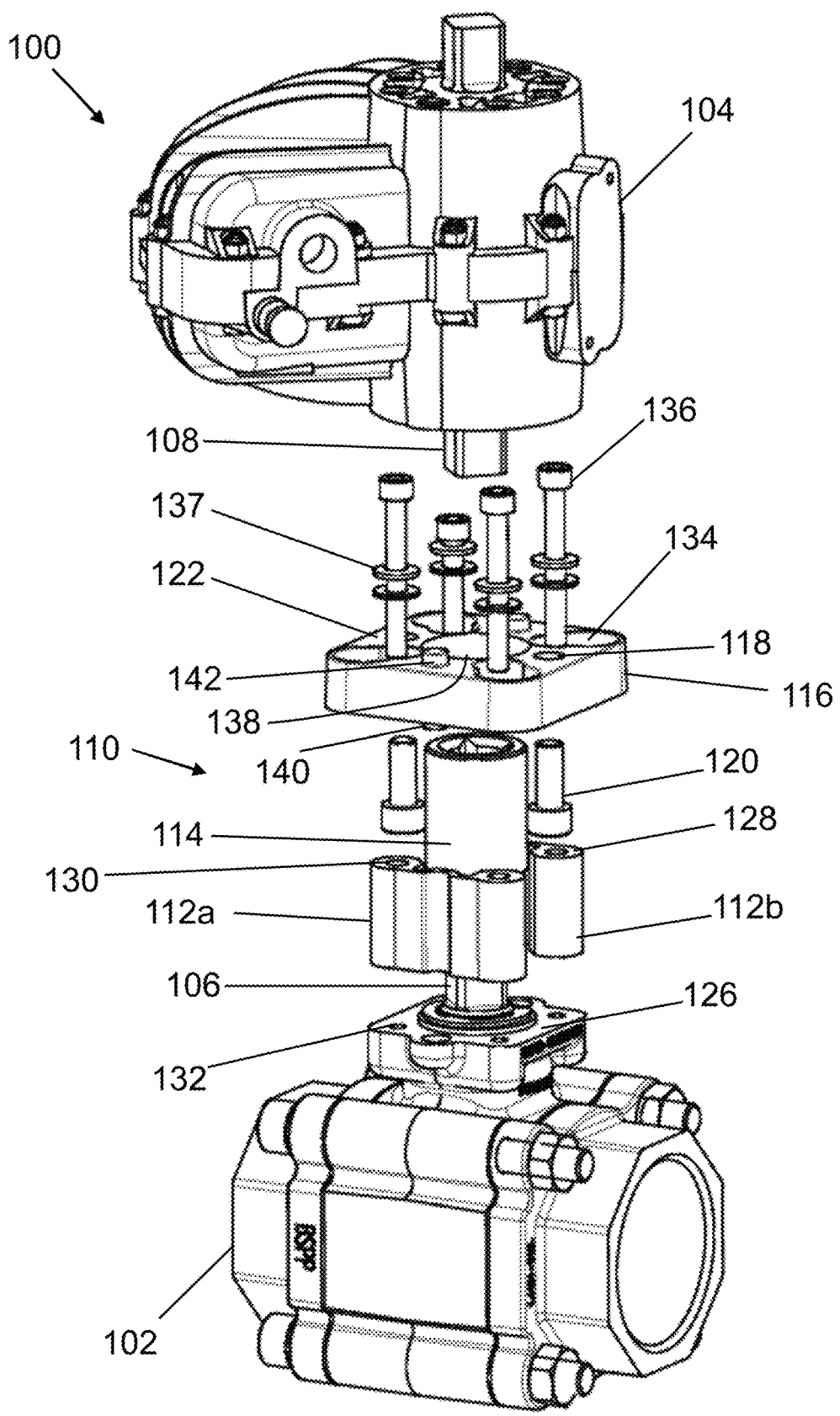
FIG. 2 shows a schematic exploded diagram of the apparatus of FIG. 1.

An apparatus 100 according to an embodiment of the invention is depicted in FIGS. 1 and 2, where FIG. 1 shows a schematic side view of the apparatus 100 and FIG. 2 shows an exploded perspective view of the apparatus 100. The apparatus 100 includes a first mechanical device in the form of a valve 102, and a second mechanical device in the form of a rotary actuator 104. The valve 102 includes a rotatable drive part in the form of a control stem 106 (visible in FIG. 2), which is rotatable to control opening and closing of the valve 102. In particular, the control stem 106 may be rotated in a first direction to open the valve 102, and the control stem 106 may be rotated in a second, opposite direction to close the valve 102. As an example, the valve 102 may be a ball valve, although other types of valve may also be used. The rotary actuator 104 is a powered device configured to rotate a rotatable drive part in the form of a driver shaft 108 (visible in FIG. 2). The rotary actuator 104 may use any suitable form of power for rotating the driver shaft 108, such as electrical power, pneumatic power, or hydraulic power. The rotary actuator 104 is configured to provide a torque on the driver shaft 108 while power is supplied to the rotary actuator 104.

The valve 102 and the rotary actuator 104 are connected by means of an adaptor 110 according to an embodiment of the invention. The adaptor 110 includes a support portion comprising a first support portion 112a and a second support portion 112b, a rotatable coupling 114, and an adaptor flange 116. The rotatable coupling 114 includes a first end which is configured for engagement with the control stem 106 of the valve 102, so that the control stem 106 and rotatable coupling 114 are rotationally coupled together. In particular, the first end of the of the rotatable coupling 114 includes a female engagement portion, such as a bore, with a shape complementary to the control stem 106 for receiving the control stem 106. The rotatable coupling 114 further includes a second end which is configured for engagement with the driver shaft 108 of the rotary actuator 104, so that the driver shaft 108 and rotatable coupling 114 are rotationally coupled together. In particular, the second end of the rotatable coupling 114 includes a female engagement portion, such as a bore, with a shape complementary to the driver shaft 108 for receiving the driver shaft 108. Accordingly, the driver shaft 108 and the control stem 106 are rotationally coupled together via the rotatable coupling 114, such that rotation of the driver shaft 108 caused by the rotary actuator 104 is transmitted to the control stem 106 via the rotatable coupling 114. Likewise, torque applied to the driver shaft 108 by the rotary actuator 104 is transmitted to the control stem 106 via the rotatable coupling 114. In this manner, the rotary actuator 104 may be operated to control opening and closing of the valve 102. The rotatable coupling 114 is located in a gap between the first support portion 112a and the second support portion 112b, such that the rotatable coupling 114 is rotatable relative to the first and second support portions 112a, 112b.

The adaptor flange 116 is mounted on rotary actuator 104. In particular, the adaptor flange 116 includes a first set of attachment points in the form of a pair of through-holes 118, through which a pair of bolts 120 extend to fasten the adaptor flange to a mounting surface on the rotary actuator 104. Ends of the bolts 120 are engaged in a pair of threaded holes in the mounting surface on the rotary actuator 104. The adaptor flange 116 includes a first surface 122 and a second surface 124 which faces in an opposite direction, the first surface 122 being engaged with (i.e. abutting) the mounting surface on the rotary actuator 104. Recesses may be provided in the second surface 124 of the adaptor flange 116, for receiving heads of the bolts 120, so that the heads of the bolts 120 do not protrude beyond the second surface 124. The second surface 124 of the adaptor flange 116 is visible in FIG. 3, which shows a plan view of the adaptor flange 116 attached to the rotary actuator 104.

Each of the first and second support portions 112a, 112b includes first a mounting surface arranged for engagement with a mounting surface 126 on the valve 102, and a second mounting surface 128 (visible in FIG. 2) arranged for engagement with the second surface 124 of the adaptor flange 116. The first and second mounting surfaces on the support portions 112a, 112b are substantially parallel planar surfaces arranged on opposite sides of the support portions, i.e. facing in opposing directions. A pair of through-holes 130 extend through each of the support portions 112a, 112b, between the first mounting surface and the second mounting surface. The through-holes 130 in the first support portion 112a and the second support portion are arranged such that they are aligned with a set of attachment points in the form of threaded (tapped) holes 132 in the mounting surface 126 on the valve 102. In particular, the pair of through-holes 130 in the first support portion 112a are aligned with a first pair of the threaded holes 132, and the pair of through-holes 130 in the second support portion 112b are aligned with a second pair of the threaded holes 132. The threaded holes 130 in the mounting surface 126 of the valve 102 may be set out in accordance with an ISO and/or DIN standard, such as ISO 5211 and DIN 3337. Thus, the through-holes 130 in the support portions 112a, 112b are arranged for alignment with the holes 130 in accordance with the relevant ISO and/or DIN standard.

The adaptor flange 116 includes a second set of attachment points in the form of a set of through-holes 134. Each of the through-holes 134 in the adaptor flange 116 is aligned with a respective through-hole 130 in the support portions 112a. Accordingly, a layout of the through-holes 134 in the adaptor flange may match the layout of the threaded holes 132 in the mounting surface 126 of the valve 102. Where the threaded holes 132 in the mounting surface 126 of the valve 102 are laid out in accordance with an ISO and/or DIN standard, the through-holes 134 in the adaptor flange 116 are also laid out in accordance with the standard. A respective bolt 136 extends through each through-hole 134 in the adaptor flange 116, and through a corresponding through-hole 130 in one of the support portions 112a, 112b, to engage one of the threaded holes 132 in the mounting surface 126 on the valve 102. In this manner, the valve 102 is secured to the adaptor flange 116 by the bolts 136, with the support portions 112a, 112b acting as spacers between the adaptor flange 116 and the valve 102. The adaptor flange 116 is in turn attached to the rotary actuator 104 by the bolts 120. Thus, the valve 102 is secured to the rotary actuator 104 via the adaptor 110. The side view of FIG. 1 shows a cross-section through the adaptor 110 and part of the valve 102, showing the bolts extending through the adaptor 116 to fasten the valve 102 to the adaptor flange 116.

In the embodiment shown, the through-holes 134 are in the form of slots (or grooves), allowing a position of the bolts 136 to be adjusted in the slots. This enables the adaptor flange 116 to be used with support portions having different arrangements of through-holes. For example, the through-holes 134 may be shaped to receive the bolts 136 in a first position for alignment with the through-holes 130 in the support portions 112*a*, 112*b*, and in a second position for alignment with through-holes in a support portion having a different (e.g. more spaced out) arrangement of through-holes. Alternatively, the adaptor flange 116 may be provided with multiple sets of through-holes 134, each set being arranged for alignment with a different arrangement of through-holes, to enable the adaptor flange 116 to be used with different support portion configurations.

Recesses are provided in the first surface 122 of the adaptor flange 116 for receiving heads of the bolts 136, so that the heads of the bolts 136 do not protrude beyond the first surface 122. As shown in FIGS. 1 and 2, each bolt 136 may have one or more washers 137 around it, such that the washers 137 are clamped between the head of the bolt 136 and a surface of the adaptor flange 116. The washers 137 may be spring washers, which are compressed by tightening of the bolts 136. Such spring washers may serve to compensate for differential thermal expansion between different parts of the apparatus 100, and in particular between the adaptor flange 116, support portions 112*a* and valve 102. The adaptor flange 116 further includes a central aperture 138 for accommodating the second end of the rotatable coupling 114, to enable the second end of the rotatable coupling 114 to engage the driver shaft 108 of the rotary actuator 104. The aperture 138 is larger than an outer diameter of the rotatable coupling 114, to allow for rotation of the rotatable coupling 114. Thus, the second end of the rotatable coupling 114 extends into the aperture 138 in the adaptor flange 116 to connect to the driver shaft 108. The through-holes 118 and 134 in the adaptor flange 116 are arranged around the central aperture 138.

The first and second support portions 112*a*, 112*b* are formed of an extruded material. For example, the first and second support portions 112*a*, 112*b* may be formed of extruded aluminium or aluminium alloy. The extrusion process for forming the first and second support portions 112*a*, 112*b* involves pressing the material (e.g. aluminium alloy) through a die to impart the material with a desired cross-sectional shape. The extruded material may then be cut into two portions (sections) of equal length, to form the first and second support portions 112*a*, 112*b*. In more detail, the extrusion process may produce a bar of extruded material having a constant cross-sectional shape along its length. The bar of extruded material may then be cut (in a direction normal to the direction of extrusion) to provide the two support portions 112*a*, 112*b* of equal length. As each of the first and second support portions 112*a*, 112*b* is obtained from the same extrusion process, both the first and second support portions 112*a*, 112*b* have the same cross-sectional shape. The cross-sectional shape of the support portions 112*a*, 112*b* can be seen in the plan view of FIG. 3. The first and second support portions 112*a*, 112*b* are mounted in the apparatus 100 such that they are symmetrically arranged about a rotation axis of the rotatable coupling 114.

Figure 4:
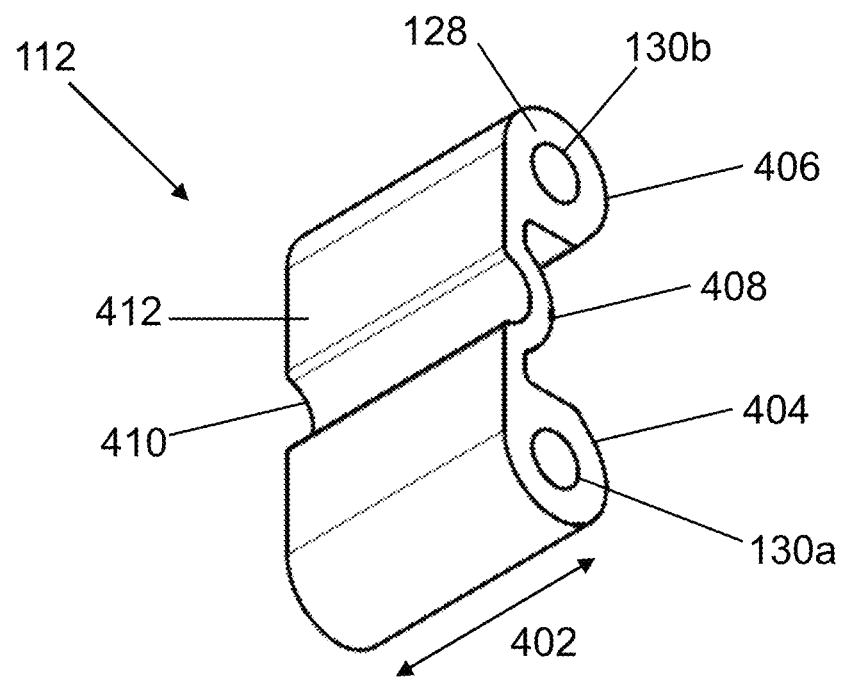
FIG. 4 shows a schematic perspective view of a support portion of the adaptor included in the apparatus of FIG. 1.

FIG. 4 shows a perspective view of a support portion 112 on its own, corresponding to one of the support portions 112*a*, 112*b*. As can be seen in FIG. 4, the support portion 112 has a constant cross-sectional shape along its length 402 (i.e. between its first and second mounting surfaces), which is imparted by the extrusion process. The through-holes 130 in the support portion 112 form part of the cross-sectional shape imparted by the extrusion process, such that no further machining of the support portion 112 is required to make the through-holes 130. Thus, the through-holes 130 extend through the support portion 112 in the direction of extrusion of the material. The length 402 of the of the support portion 112 may be adjusted to obtain a desired spacing between the valve 102 and the rotary actuator 104, by cutting the extruded material to a predetermined length.

As indicated in FIG. 4, the support portion 112 includes a body having a first part 404 through which a first through-hole 130*a* extends, and a second part 406 through which a second through-hole 130*b* extends. The first part 404 and the second part 406 of the body are connected by a connecting part 408 of the body. A thickness of the connecting part 408 is less than a width of the first part 404 and the second part 406 in a direction normal to a longitudinal direction of the through-holes 130*a*, 130*b*. In other words, the cross-section of the support portion 112 (in a direction normal to the length 402 of the support portion 112) is thinner in the connecting part 408, compared to the first and second parts 404, 406 where the through-holes 130*a*, 130*b* are located. This may reduce a mass of the support portion 112 (e.g. compared to a case where the cross-section of the support portion has a substantially constant width), the contributing to reducing a mass of the apparatus 100. In some cases, the mounting surface 126 on the valve 102 and/or the second surface 124 of the adaptor flange 116 may comprise a raised register (e.g. in the form or a raised lip or the like). The cross-section of the support portion 112 may then be adapted for engagement with the raised register on the mounting surface 126 and/or second surface 124, to facilitate locating the support portion 112 relative to the mounting surface 126 and/or second surface 124. In other words, the cross-sectional shape of the support portion 112 may be complementary to the raised register.

Figure 3:
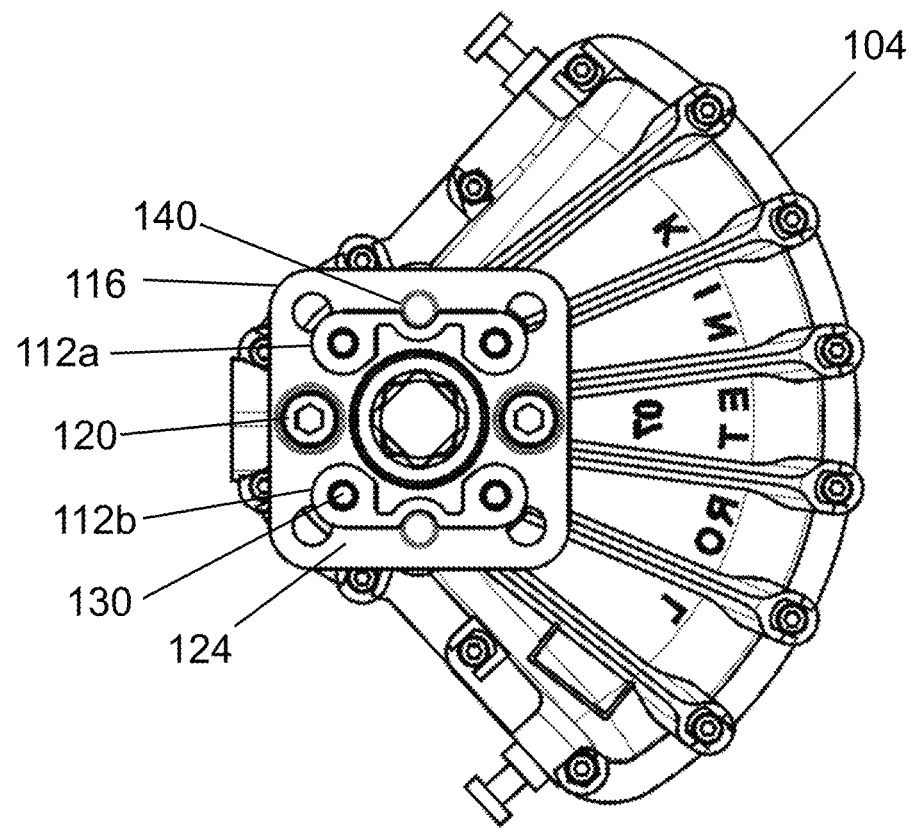
FIG. 3 shows a schematic plan view of part of the apparatus of FIG. 1.

Additionally, a locating feature 410 is provided on a side surface 412 of the support portion 112. The locating feature 410 forms part of the cross-sectional shape of the support portion 112 as imparted by the extrusion process, and thus extends on the side surface 412 along the length 402 of the support portion 112, i.e. from the first mounting surface to the second mounting surface. The locating feature 410 is a channel (or groove) provided in the side surface 412 in the connecting part 408 of the body, i.e. between the two through-holes 130*a*, 13*b*. As shown in FIGS. 2 and 3, the locating feature 410 is arranged to engage a locating pin 140 which protrudes from the second surface 124 of the adaptor flange 116. In particular, the adaptor flange includes a pair of locating pins 140 protruding from its second surface 124, to engage the locating feature 410 on the side surface 412 of each of the first and second support portions 112*a*, 112*b*. Engagement of the locating pins 140 with the locating feature 410 on each support portion 112*a*, 112*b* may facilitate correct positioning and alignment of the support portions 112*a*, 112*b* in the apparatus 100. In some cases, the mounting surface 126 may also include protruding locating pins for engagement with the locating feature 410 in each support portion 112*a*, 112*b*. Further, as illustrated in FIG. 2, the adaptor flange 116 can include locating pins 142 protruding from its first mounting surface 122, for engagement with corresponding locating holes in the mounting surface on the rotary actuator 104.

Figure 5:
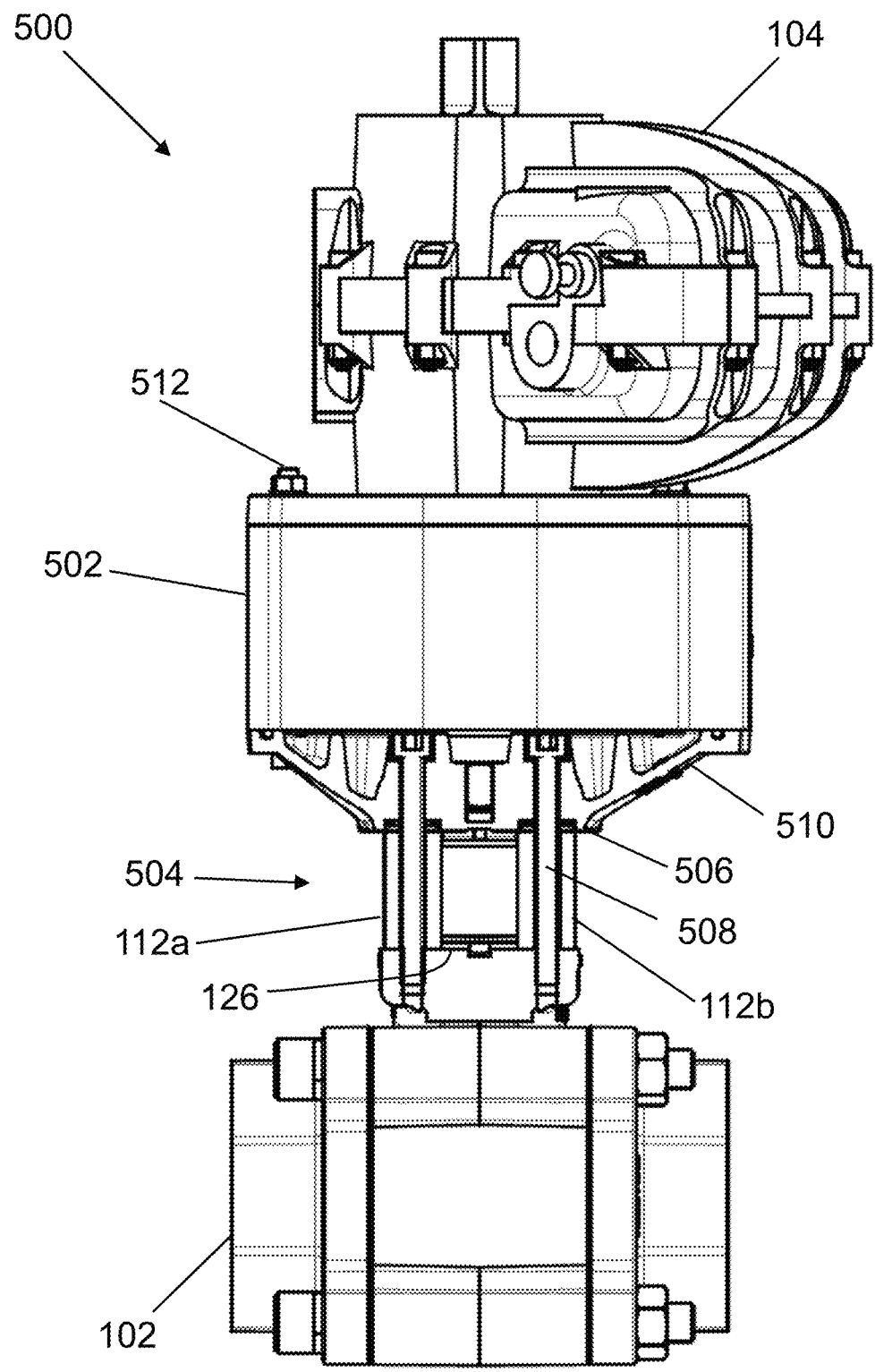
FIG. 5 shows a schematic side view of an apparatus according to an embodiment of the invention, which includes an adaptor according to an embodiment of the invention; the side view of FIG. 5 includes a cross-section through the adaptor.

FIG. 5 shows a schematic side view of an apparatus 500 according to an embodiment of the invention. Features of the apparatus 500 which correspond to features of the apparatus 100 described above are indicated in FIG. 5 using the same reference numerals as in FIGS. 1-4, and are not described again.

Similarly to the apparatus 100 described above, the apparatus 500 includes a valve 102 which is coupled to a rotary actuator 104. In addition, the apparatus 500 includes a spring return device 502, which is coupled between the rotary actuator 104 and the valve 102. In particular, the spring return device 502 includes a rotatable coupling (not shown) having a first end which is engaged with the driver shaft 108 of the rotary actuator 104, so that the two are rotationally coupled together. A housing of the spring return device 502 is fastened to the mounting surface on the rotary actuator 104 using any suitable fasteners, e.g. bolts or screws.

The valve 102 and spring return device 502 are connected by means of an adaptor 504 according to an embodiment of the invention. Similarly to the adaptor 110 described above, the adaptor 504 includes a first support portion and a second support portion 112a, 112b, and a rotatable coupling 114. The rotatable coupling 114 of the adaptor 504 includes a first end which is engaged with the control stem 106 of the valve 102, so that they are rotationally coupled together. A second end of the rotatable coupling 114 of the adaptor 504 is engaged with the rotatable coupling of the spring return device 502, so that they are rotationally coupled together. Thus, the control stem 106 of the valve 102 and the driver shaft 108 of the rotary actuator 104 are rotationally coupled together via the rotatable coupling of the spring return device 502 and the rotatable coupling 114 of the adaptor 502. The spring return device 502 is configured to return the valve 102 to a predetermined safe state, in case of failure of the rotary actuator 104. For example, the spring return device 502 may be configured to return the valve to a closed state (alternatively open state) in case of failure of the rotary actuator 104. In more detail, the spring return device 502 includes a spring, such as a clock-spring, which is coupled to its rotatable coupling. The spring is arranged such that when the control stem 106 of the valve is rotated in a first direction away from the predetermined safe state (e.g. closed), mechanical energy is stored in the spring and the spring provides a torque which opposes rotation of the control stem 106. Thus, when sufficient power is supplied to the rotary actuator 104, the driver shaft 108, the rotatable coupling of the spring return device 502, the rotatable coupling 114 of the adaptor 504, and the control stem 106 of the valve 102 are rotated in the first direction to change an operational state of the mechanical device, for example to open the valve 102. This rotation is against the torque provided by the spring in the spring return device 502, and power must be continually provided to the rotary actuator 104 to balance the torque provided by the spring to maintain the valve 102 in the desired state. In the event of interruption of power to the rotary actuator 104, the torque provided by the spring in the spring return device 502 will no longer be balanced by the rotary actuator 104, and therefore this torque will cause rotation of control stem 106 in the second direction to change the operational state of the valve 102 to the predetermined safe state (e.g. closed). Examples of spring return devices are disclosed, for example, in GB 2598095 A, which is incorporated herein in its entirety.

Figure 6:
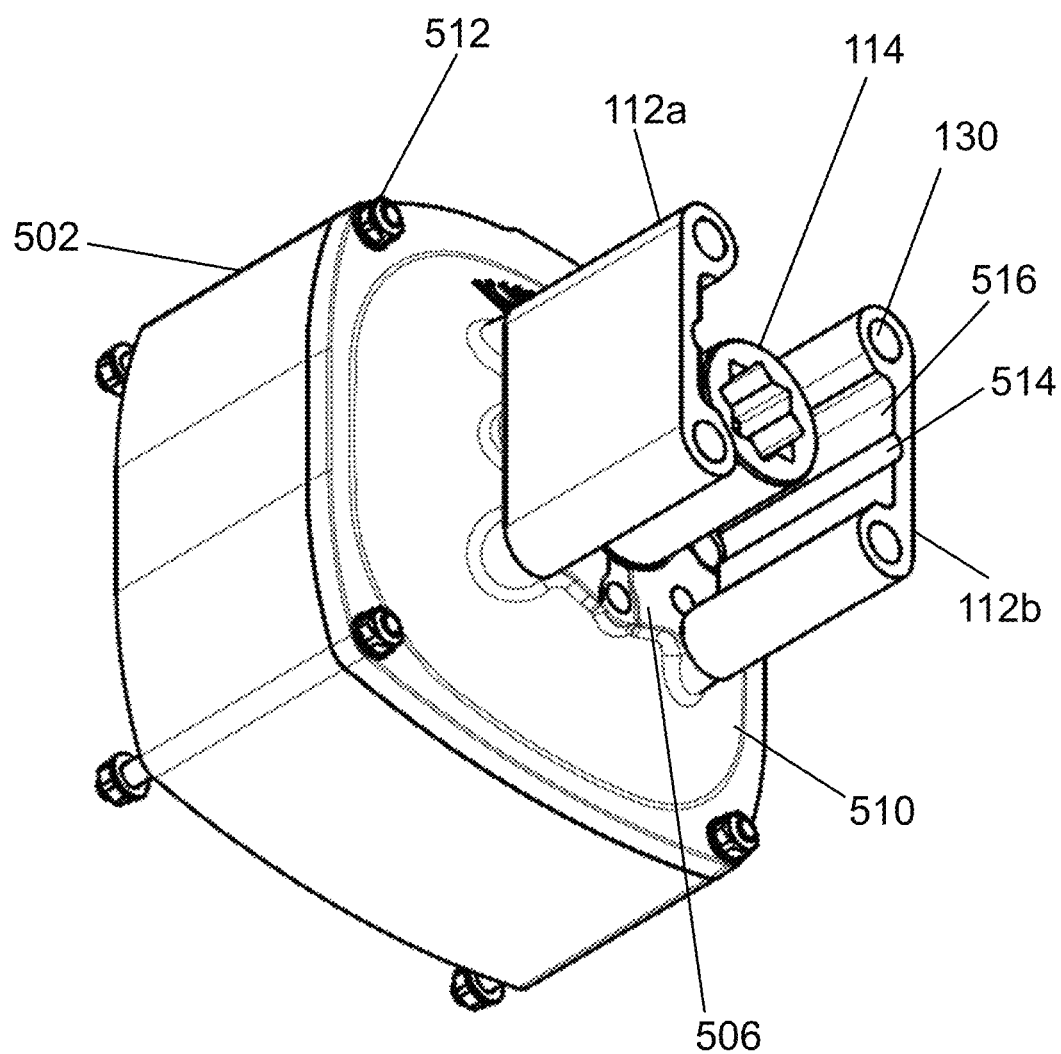
FIG. 6 shows a schematic perspective view of part of the apparatus of FIG. 5

In contrast to the adaptor 110 of apparatus 100 described above, the adaptor 504 does not include an adaptor flange. Instead, the first mounting surface 128 on the support portions 112a, 112b of the adaptor 504 directly engages a mounting surface 506 on the spring return device 502. FIG. 6 shows a perspective view of the adaptor 504 engaged on the mounting surface 506 of the spring return device 502. The mounting surface 506 on the spring return device 502 is provided on an external surface of a housing of the spring return device 502. A set of through-holes is formed in the mounting surface 506 of the spring return device 502, the through-holes in the mounting surface 506 being aligned with the through-holes 130 in the support portions 112a, 112b. Bolts 508 pass through the through-holes in the mounting surface 506 of the spring return device 502, and extend through the through-holes 130 in the support portions 112a, 112b to engage the threaded holes 132 in the mounting surface 126 on the valve 102. In this manner, the bolts 508 secure the valve 102 to the spring return device 502, with the support portions 112a, 112b acting as spacers between the valve 102 and the spring return device 502.

Heads of the bolts 508 are located inside the housing of the spring return device, such that the bolts 508 may be tightened (or loosened) from within the housing. Thus, the bolts 508 may be inserted into the through-holes and tightened prior to closing the housing of the spring return device 502. The side view of FIG. 5 shows a cross-section through the adaptor 504 and part of the valve 102, to show the locations of the bolts 508. The housing of the spring return device 502 may be openable to provide access to the heads of the bolts 508. In the example shown, the housing of the spring return device includes a cover 510 on which the mounting surface 506 and through-holes are provided. The cover 510 is secured to the rest of the housing by means of bolts 512 or other suitable fasteners. In this manner, the cover 510 can be disconnected from the rest of the housing of the spring return device 502 to provide access to the heads of the bolts 508. Additionally spring washers may be provided on each bolt 508, such that the spring washers are clamped between the head of the bolt 508 and an inner surface of the cover 510. In some cases, sealing washer may be provided on each bolt 508, such that the sealing washer are clamped between the head of the bolt 508 and the inner surface of the cover 510. In this manner, the sealing washers may form a seal around the bolts 508, to prevent ingress of substances into the housing of the spring return device 502 around the bolts 508. The sealing washers may be provided additionally or alternatively to the spring washers mentioned above.

The support portions 112a, 112b of the adaptor 504 are formed of an extruded material, as described above in relation to adaptor 110. The support portions 112a, 112b of the adaptor 504 have a similar cross-sectional shape to that described in relation to FIG. 4, including first and second parts in which the through-holes 130 are formed, and a thinner connecting part between the through-holes 130. As shown in FIG. 6, each support portion 112a, 112b of the adaptor 504 has a locating feature 514 in the form of a groove on a side surface 516 of the support portion extending between the first and second mounting surfaces of the support portion. The locating feature 514 may engage a locating pin protruding on the mounting surface 506 of the spring return device 502, and or the locating feature 514 may engage a locating pin protruding on the mounting surface 126 of the valve 102. The support portions 112a, 112b of the adaptor 504 can have a slightly different cross-sectional shape compared to the support portions 112a, 112b of the adaptor 110. In particular, the locating feature 514 on each support portion 112a, 112b of the adaptor 504 is located on an inward facing side surface 516 of the support portion (i.e. so that the locating feature 514 is on a surface of the support portion that faces towards the rotatable coupling 114), whereas in adaptor 110 the locating feature 410 is located on the outward facing side surface 412 of the support portion (i.e. so that the locating feature 410 is on a surface of the support portion that faces away from the rotatable coupling 114). Additionally or alternatively, the mounting surface 126 of the valve 102 and/or the mounting surface 506 on the spring return device 502 may comprise a raised register for locating the support portions 112a, 112b. For example, the raised register may have a shape complementary to the cross-sectional shape of the support portions 112a, 112b.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An adaptor for connecting a first mechanical device to a second mechanical device, the adaptor comprising:
   a support portion having a first mounting surface and a second mounting surface arranged on opposing sides of the support portion, wherein the support portion is formed of an extruded material, and wherein one or more through-holes extend through the support portion between the first mounting surface and the second mounting surface, each of the one or more through-holes being arranged to receive a respective screw or bolt for securing the first mechanical device to the second mechanical device; and
   a rotatable coupling having a first end configured to engage a rotatable drive part of the first mechanical device and a second end configured to engage a rotatable drive part of the second mechanical device, wherein the rotatable coupling is rotatable relative to the support portion,
   wherein:
   the support portion comprises a body through which a first one and a second one of the one or more through-holes extend;
   the body includes a connecting part which connects a first part of the body through which the first through-hole extends and a second part of the body through which the second through-hole extends; and
   a thickness of the connecting part is less than a width of the first part and the second part in a direction normal to a longitudinal direction of the first and second through-holes.

2. The adaptor according to claim 1, wherein the support portion comprises a locating feature which extends from the first mounting surface to the second mounting surface.

3. The adaptor according to claim 2, wherein the locating feature comprises a groove and/or a protrusion on a side surface of the support portion connecting the first and second mounting surfaces.

4. The adaptor according to claim 1, wherein the support portion is formed of extruded aluminium or an aluminium alloy.

5. The adaptor according to claim 1, wherein the support portion comprises a locating feature which extends from the first mounting surface to the second mounting surface, and
   wherein the locating feature is on a side surface of the connecting part.

6. The adaptor according to claim 1, wherein the support portion comprises a first support portion and a second support portion which is separate from the first support portion; and wherein a respective through-hole of the one or more through-holes extends through each of the first support portion and the second support portion.

7. The adaptor according to claim 6, wherein the rotatable coupling is arranged in a gap between the first support portion and the second support portion.

8. The adaptor according to claim 6, wherein the first support portion and the second support portion comprise a same cross-sectional shape.

9. The adaptor according to claim 1, wherein the one or more through-holes are arranged for alignment with attachment points in accordance with an ISO and/or DIN standard.

10. The adaptor according to claim 1, wherein the one or more through holes comprises a plurality of through-holes arranged around the rotatable coupling.

11. The adaptor according to claim 1 further comprising an adaptor flange, the adaptor flange having:
    a first set of attachment points for attaching the adaptor flange to the second mechanical device; and
    a second set of attachment points for alignment with the one or more through-holes.

12. The adaptor according to claim 11, wherein the support portion comprises a locating feature which extends from the first mounting surface to the second mounting surface, and
    wherein the adaptor flange comprises a surface having a protrusion arranged to engage the locating feature on the support portion when the surface of the adaptor flange is engaged with the second mounting surface of the support portion.

13. The adaptor according to claim 11, wherein the adaptor flange is formed of a die cast material.

14. The adaptor according to claim 1, wherein the support portion comprises a locating feature which extends from the first mounting surface to the second mounting surface;
    wherein the locating feature comprises a groove and/or a protrusion on a side surface of the support portion connecting the first and second mounting surfaces; and wherein the locating feature is on a side surface of the connecting part.

15. An apparatus comprising:
a first mechanical device having a rotatable drive part;
a second mechanical device having a rotatable drive part; and
an adaptor comprising:
  a support portion having a first mounting surface and a second mounting surface arranged on opposing sides of the support portion, wherein the support portion is formed of an extruded material, and wherein one or more through-holes extend through the support portion between the first mounting surface and the second mounting surface, wherein the support portion is positioned between the first mechanical device and the second mechanical device, with a respective bolt or screw extending through each of the one or more through-holes to secure the first mechanical device to the second mechanical device wherein,
the support portion comprises a body through which a first one and a second one of the one or more through-holes extend;
the body includes a connecting part which connects a first part of the body through which the first through-hole extends and a second part of the body through which the second through-hole extends; and
a thickness of the connecting part is less than a width of the first part and the second part in a direction normal to a longitudinal direction of the first and second through-holes; and
a rotatable coupling having a first end configured to engage a rotatable drive part of the first mechanical device and a second end configured to engage a rotatable drive part of the second mechanical device, wherein the rotatable coupling is rotatable relative to the support portion, wherein the first end of the rotatable coupling is engaged with the rotatable drive part of the first mechanical device, and the second end of the rotatable coupling is engaged with the rotatable drive part of the second mechanical device.

16. The apparatus according to claim 15, further comprising a compressed spring washer on each respective bolt.

17. The apparatus according to claim 15, wherein a head of each respective bolt is located in a housing of the second mechanical device such that the bolt protrudes through an opening in the housing.

18. The apparatus according to claim 15, wherein the first mechanical device comprises a valve, and the second mechanical device comprises a rotary actuator and/or a spring return device.

19. A method of connecting a first mechanical device to a second mechanical device, the method comprising:
  forming a support portion of an adaptor via a material extrusion process, wherein one or more through-holes extend through the support portion between a first mounting surface and a second mounting surface arranged on opposing sides of the support portion;
  engaging a first end of a rotatable coupling of the adaptor with a rotatable drive part of the first mechanical device, and engaging a second end of the rotatable coupling with a rotatable drive part of the second mechanical device; and
  positioning the support portion between the first mechanical device and the second mechanical device, and securing the first mechanical device to the second mechanical device with a respective bolt passing through each of the one or more through-holes,
wherein:
the support portion comprises a body through which a first one and a second one of the one or more through-holes extend;
the body includes a connecting part which connects a first part of the body through which the first through-hole extends and a second part of the body through which the second through-hole extends; and
a thickness of the connecting part is less than a width of the first part and the second part in a direction normal to a longitudinal direction of the first and second through-holes.

* * * * *